United States Patent
Westphal et al.

(10) Patent No.: US 7,987,247 B2
(45) Date of Patent: Jul. 26, 2011

(54) BACNET PROTOCOL MS/TP AUTOMATIC MAC ADDRESSING

(75) Inventors: Bruce Dale Westphal, Elkhart, IN (US);
Jeptha Roy Hall, Nappanee, IN (US);
David Paul Bohlmann, Granger, IN (US); Gregory A. Zuercher, South Whitley, IN (US)

(73) Assignee: KMC Controls, Inc., New Paris, IN (US)

( * ) Notice: Subject to any disclaimer, the term of this patent is extended or adjusted under 35 U.S.C. 154(b) by 362 days.

(21) Appl. No.: 12/326,852

(22) Filed: Dec. 2, 2008

(65) Prior Publication Data
US 2009/0271001 A1 Oct. 29, 2009

Related U.S. Application Data

(60) Provisional application No. 61/048,544, filed on Apr. 28, 2008.

(51) Int. Cl.
*G06F 15/16* (2006.01)
(52) U.S. Cl. ........ 709/220; 709/221; 709/222; 709/223; 709/224; 370/252; 370/254; 700/276
(58) Field of Classification Search .................... 709/220
See application file for complete search history.

(56) References Cited

U.S. PATENT DOCUMENTS

| | | | |
|---|---|---|---|
| 4,899,274 A | 2/1990 | Hansen et al. | |
| 5,276,813 A | 1/1994 | Elliott et al. | |
| 6,487,601 B1 * | 11/2002 | Hubacher et al. | 709/229 |
| 6,611,863 B1 * | 8/2003 | Banginwar | 709/220 |
| 7,039,688 B2 * | 5/2006 | Matsuda et al. | 709/220 |
| 7,096,257 B2 | 8/2006 | Trisno et al. | |
| 7,219,141 B2 | 5/2007 | Bonasia et al. | |
| 7,370,093 B2 | 5/2008 | Ohara | |
| 2006/0221846 A1 * | 10/2006 | Dyck et al. | 370/252 |
| 2006/0224711 A1 * | 10/2006 | Engel et al. | 709/223 |
| 2007/0043476 A1 * | 2/2007 | Richards et al. | 700/276 |
| 2008/0125057 A1 * | 5/2008 | Nass et al. | 455/73 |
| 2008/0259817 A1 * | 10/2008 | Jeansonne et al. | 370/254 |

* cited by examiner

Primary Examiner — Dohm Chankong
Assistant Examiner — Neeraj Utreja
(74) Attorney, Agent, or Firm — Shewchuk IP Services, LLC; Jeffrey D. Shewchuk (57) ABSTRACT

A Building Automation System (BAS) includes at least one Direct Digital Control (DDC) controller operating as a BACnet MS/TP master considered to be an "Anchor". The Anchor operates an algorithm or method which automatically assigns BACnet Protocol MS/TP Media Access Control (MAC) addresses to other BAS components (considered Nomads) being installed into the network. The Anchor gathers MAC addresses existing on the MS/TP network, and issues an available MAC Pool Announcement. Each Nomad randomly picks a temporary MAC address. When the Anchor verifies singular communication at the temporary MAC address, the Anchor assigns a permanent MAC address to the Nomad, which can later be locked into flash memory. Using the preferred algorithm and method, Nomad devices are automatically assigned unused MAC addresses to join the MS/TP network in a non-conflicting, orderly way, with all communications occurring within the confines of BACnet MS/TP Protocol.

15 Claims, 2 Drawing Sheets

BACNET PROTOCOL MS/TP AUTOMATIC MAC ADDRESSING

CROSS-REFERENCE TO RELATED APPLICATION(S)

This application claims priority from provisional application No. 61/048,544, filed Apr. 28, 2008, incorporated by reference.

BACKGROUND OF THE INVENTION

The present invention relates to building automation systems, and, more particularly, to communications among control equipment for building automation systems.

The American Society of Heating, Refrigeration and Air Conditioning Engineers (ASHRAE) has, over the last few decades, undertaken a considerable effort to standardize communication protocols between various manufacturers of Heating, Ventilation and Air Conditioning (HVAC) equipment. Primary among these efforts is ASHRAE's development of a Building Automation and Control Network (BACnet) Protocol Standard for communication between Direct Digital Control (DDC) HVAC components. Through the use of BACnet protocol, DDC HVAC equipment made by numerous different manufacturers can be seamlessly integrated into a unified system. Beyond HVAC, the BACnet protocol can also be used for lighting, security and other building control systems.

The BACnet protocol can be established using various types of wiring and communication media and methods, with one of the basic, fairly inexpensive options being Master Slave/Token Passing (MS/TP) networking across RS-485 wiring, such as using an EIA-485 standard communication bus. An MS/TP network has one or more master nodes that are peers on a logical token-passing network. Master devices are allowed to initiate BACnet message sequences whenever they have the token. Only one master is allowed to have the token at any given time. Examples of typical master devices include programmable logic controllers, terminal unit controllers, air handler unit controllers, and other types of controllers, and the term "DDC controller" is used to refer to any device capable of acting as a master on a BACnet MS/TP network. The MS/TP network may also have slave nodes that are unable to transmit messages until requested to do so by a master node. Examples of typical slave input devices include temperature sensors, humidity sensors, pressure sensors, flow sensors, lighting sensors, relays and some types of switches. Examples of typical slave output devices include valves, actuators, dampers, fans and most relays and switches. The term "BAS component" is used to refer to any device capable of acting either as a master or a slave on a BACnet MS/TP network, An MS/TP network can be made up of entirely master nodes forming a peer-to peer network, of a single master node and all other nodes as slaves, or of multiple masters and slaves.

In BACnet MS/TP networks, each device communicating on the network requires a unique address. Addresses consist of a network number (0 to 65,535) and a device media access control (MAC) address of only one octet. This one octet address space is divided into two separate ranges. The address range 0-127 may be used for either master nodes or slave nodes. The address range 128-255 is reserved for slave devices. This permits the address space to be configured to meet the needs of a particular application. BACnet MS/TP devices may have MAC addresses that are the same, within a system of networks called a BACnet internetwork. Multiple networks can by configured for inter-network communications using routers, including BACnet communications outside of MS/TP. Conversions from the BACnet protocol to/with other proprietary communications schemes can be preformed with various interface devices.

Addressing possibilities are complicated by the randomness of the steps taken for third parties to install and power BACnet MS/TP devices at a construction or building site. The electrician installs the controllers, input and output devices, often in a relatively randomized order based upon the building layout and construction schedule. As the various devices are positioned and installed, the electrician connects them to the power source, to the communications network and to other equipment as necessary. During installation, the units are often powered on/off several times to check local performance. The network may be segmented and individual segments may have power applied and merged with other segments at any time. Some of the BACnet MS/TP devices, such as controllers that have built in application programs (i.e. VAV units), are required to perform their local functions regardless of their network connection status. Installation can also occur in widely separated time frames, including legacy HVAC equipment and legacy HVAC controls equipment, such as when all buildings on a campus are not simultaneously constructed, or when an HVAC control solution is retrofitted into existing building(s).

Generally speaking, there are four methods which have been used for assigning BACnet MS/TP MAC addresses in DDC HVAC equipment:

1) Pre-determined MAC addresses can be loaded onto the device in the factory using an additional manufacturing process, such as burning the MAC address into firmware for the device. (Many non-BACnet networking devices have a permanent, manufacturer assigned 6 byte (48 bits) MAC address which is a unique address that is burned into each networking product by the manufacturer in order to uniquely identify that particular product. Manufacturers take great care to ensure that each 6 byte MAC address burned into a product is unique.) In the BACnet MS/TP environment, with the MAC address being only 1 byte (8 bits), manufacturers must duplicate MAC addresses for products residing on different networks. Because BACnet MS/TP MAC addresses can be duplicates, both manufacturers and installers must be very careful not to install two DDC devices having the same pre-determined MAC address on the same network. Pre-addressing at the time of manufacture can lead to costly and time-consuming errors caused by incorrect installation placement.

2) An operator can manually assign the BACnet MS/TP MAC address through software after the controller is installed. Manual assignment of the BACnet MS/TP MAC address is often a cumbersome process, requiring both education of the installer and then requiring additional installation time to get each network up and operating. Like virtually all manual installation operations, manual assignment of BACnet MS/TP MAC addresses also introduces the possibility of human error.

3) The installer can set the BACnet MS/TP MAC address through a hardware interface such as dip switches. While using hardware to set the MAC address generally requires less installer education than the manual software set process, it further requires access to each device, which can be in a difficult to access (and often dark) location after installation. Similar to the manual software-set process, the manual hardware-set MAC address has a possibility of human error.

4) Manufacturers can devote a special product (hardware and software) on the network to assign addresses with operator interaction. While all of these existing methods add cost to the product or installation labor, the addition of a special MAC-assigning product is particularly expensive.

To complicate matters further, the communication electronics adhering to the BACnet MS/TP protocol are limited to half-duplex operation which means that some BAS components do not have the ability to monitor their own communication transmissions; hence they are unable to detect message collisions while transmitting. The BACnet protocol does not provide a method whereby devices can automatically detect such collisions, as is available in the well-known IEEE 802.3 Ethernet standard. This makes it very difficult for the BAS components to join the BACnet MS/TP network in an orderly fashion without having pre-assigned unique MAC addresses. Transmissions on the BACnet MS/TP network are only made by the device having the token, and token passing is often accomplished through addressed data frames in a format defined by the BACnet protocol. For instance, the common "Who-Is", "I-Am", "Who-Has", "I-Have", "ReadProperty" and "WriteProperty" BACnet services are based on data frame definitions which include the established MAC address. Network traffic can become confused or impossible before MAC addresses are properly established for all the network devices.

Even after MAC addresses are assigned successfully where there are no collisions, network performance may not be efficient. The BACnet protocol standard does not specify methods to increase efficiency. One metric for BACnet MS/TP network performance, or efficiency, is "token cycle time", which is the amount of time between successive possessions of the token by any particular master device. The BACnet protocol requires master devices to automatically search for other master devices as a method of network robustness. Using the standard method, a master device will detect the MAC address of the next master device. If the numerical difference between the master device's MAC address and the next device is greater than one, then there exists a "MAC gap". The protocol requires master devices to periodically search for master devices within this gap. Such searching takes time, and can significantly degrade network performance by adding this search time, thereby increasing the token cycle time. In such cases, the token cycle time can be increased by an amount that the system cannot function as a whole nor be monitored or controlled by an operator.

Additionally, because the vast majority of BACnet devices are installed into a building in a relatively permanent way (and constitute fixtures in the building), the turnover of BACnet devices is relatively small compared to many other types of networks. The MAC addressing strategy should be a "set it and forget it" type of scheme, which is performed when the HVAC control equipment is installed or replaced, but otherwise occupies as little bandwidth on the BACnet MS/TP network as possible.

BRIEF SUMMARY OF THE INVENTION

The present invention is an algorithm and method, and building automation system (BAS) components configured to automatically assign Media Access Control (MAC) addresses to networked MS/TP devices. The building automation system has at least two components which can communicate via a BACnet MS/TP network. One of the components is a DDC controller operating as a BACnet MS/TP master considered to be an "Anchor", while the other auto-address component(s) can be BAS component(s) operating as either a BACnet MS/TP master or as a BACnet MS/TP slave considered to be a "Nomad". After installation of both the Anchor and the Nomad(s) into the BACnet MS/TP network, the Anchor assigns an MS/TP MAC address to the Nomad(s). Using the preferred algorithm and method, Nomad devices are automatically assigned unused MAC addresses to join the MS/TP network in a non-conflicting, orderly way, with all communications occurring within the confines of BACnet MS/TP Protocol in an efficient manner.

While the above-identified drawing figures set one or more forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
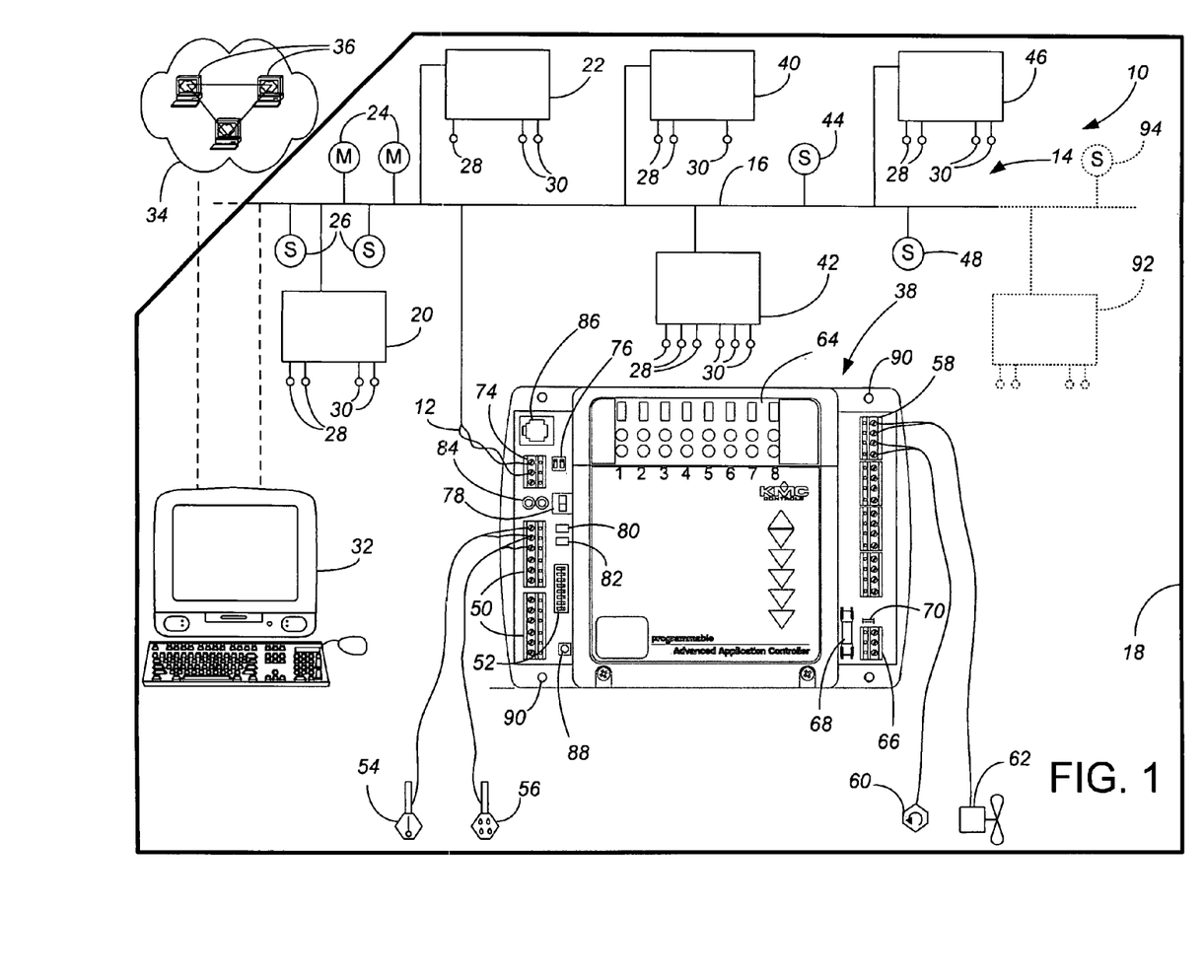
FIG. 1 is a depiction, largely schematic, showing an example HVAC MS/TP BACnet network implemented using the present invention.

An exemplary HVAC controls system 10 for use with the present invention is shown in FIG. 1. The system 10 consists of a number of BAS components wired using conventional RS-485 wiring 12 into a MS/TP BACnet network 14 using an EIA-485 standard communication bus 16.

As depicted in this example, part of the MS/TP network 14 is already in place in a building 18, and includes a first DDC controller 20, a second DDC controller 22, two additional master BAS components 24 and two additional slave BAS components 26. The term "building" as used herein, can include any structure or outdoor location wherein an HVAC system or other BAS is operating within a single control network, and could be a floor, a portion of a floor or several floors, or a campus or geographically remote buildings electronically joined into a single control network. The first controller 20 is shown with two inputs 28 and two outputs 30, while the second controller 22 is depicted with a single input 28 and two outputs 30. To fully benefit from the cross-manufacturer aspect of BACnet, each of these six BAS components 20, 22, 24, 26 can be made by different manufacturers. The present invention can be equally used in the first BAS components installed into the MS/TP network 14, into all BAS components installed into the MS/TP network 14, or into any subset of two or more BAS components installed into the MS/TP network 14.

By BACnet MS/TP network definition, each BAS component 20, 22, 24, 26 exists on network 14 under its own MAC address. The value of that existing MAC address for each component 20, 22, 24, 26 is initially unknown; each existing MAC address may have been assigned by any of the four prior art methods described in the Background above.

A personal computer workstation 32 may be attached into the BACnet network 14, either permanently or intermittently. The computer workstation 32 may communicate outside the network 14 such as over the internet 34 with other computers or network devices 36. Additionally, the BACnet network 14 depicted may be interconnected with numerous other BACnet or proprietary BAS networks (other networks not shown). The connection lines with both the computer workstation 32 and the additional networks are depicted in dashed lines to indicate that the presence or absence of such further workstations/networks is not significant to the application of the present invention to the particular network 14 of interest.

In any event, in this example several further BAS components 38, 40, 42, 44, 46, 48 are to be installed into the building 18 and added to the existing BACnet MS/TP network 14. One of the to-be-added BAS components is a DDC controller 38 selected as an "anchor" component, while, as will be explained, the remaining BAS components 40, 42, 44, 46, 48 will be added to the BACnet MS/TP network 14 as "nomads". The Anchor 38 in this embodiment is, other than for the additional firmware, hardware or software to implement the present invention, a typical BAS master DDC controller.

For instance, the anchor controller 38 may be similar to existing BACnet DDC controllers manufactured and marketed by KMC Controls of New Paris, Ind., such as a BAC-5801 8×8 Advanced Application Controller. This exemplary controller 38 has a series of eight universal inputs, each of which is programmable as an analog, binary, or accumulator BACnet object, such as provided by two removable screw terminal blocks 50 (eight input and four grounds total) which can receive 14-22 AWG wire. A series of switches 52, one for each input, is selectably used to add a pull-up resistor across each input. As shown in FIG. 1, two input devices of a temperature sensor 54 and a humidity sensor 56 are wired into the first two inputs of the controller 38. More or less inputs and input devices, and different types of input devices, can alternatively be used as known in the art of BAS networking.

The exemplary anchor controller 38 also provides a series of eight universal outputs, each of which is programmable as an analog or binary BACnet object, such as provided by four removable screw terminal blocks 58 (eight output pairs total) which can receive 14-22 AWG wire. As shown in FIG. 1, two output devices of an actuator 60 and a fan 62 are wired into the first two outputs of the controller 38. More or less outputs or output devices, and different types of output devices, can alternatively be used as known in the art of BAS networking. Slots are provided for output override boards (one for each output), such as underneath an override board cover 64 having openings for a HAND-OFF-AUTO switch, a status LED, and a manual potentiometer adjustment screw for each board.

Another terminal block 66 is provided for the power supply (preferably 24 volts AC, 60 Hz) to power the controller 38. A power supply fuse 68 may be accessible on the face of the controller 38, as well as a power supply jumper 70.

Networking to the Anchor component 38 is accomplished as known in the art by RS-485 wiring 12 (ungrounded wiring shown for simplicity, grounded wiring preferred) into a removable networking screw terminal block 74. Networking switching is provided, such as two end-of-line switches 76 and a disconnect network switch 78. LEDs are provided to visually communicate certain functions of the controller 38 without a screen, such as a "READY" green LED 80 and a "COMM" or communication status yellow LED 82. Isolation lamps 84 can simultaneously act as networking fuses and to indicate improper communication phasing between various controllers 20, 22, 24, 26, 38, 40, 42, 44, 46, 48 on the network 14. An RJ-12 jack 86 is provided for communication with other outside devices (not shown).

A reset button 88 is accessible on the face of the controller 38. In addition to the inventive features added in the preferred embodiment, the reset button 88 has typical features known in the art. For instance, to perform a "cold start", thereby restarting controller programs and returning BACnet object states to the initial factory settings but leaving configuration and programming intact, the reset button 88 is pressed, the power jumper 70 is removed, and the reset button 88 is released before replacing the power jumper 70. To reestablish all factory settings and erase all subsequent configuration and programming information, the power jumper 70 is removed, and the reset button 88 is pressed and held while the power jumper 70 is replaced.

The Anchor 38 has several installation screw openings 90 for installation into a building 18 as a fixture.

In this particular example, when the master Anchor 38 is installed, several nomad BAS components 40, 42, 44, 46, 48 are added to the network 14 at the same time. Still other nomad devices 92, 94 (shown in dashed lines) are expected to be added to the network 14 at a later date.

The electrician installs the controllers 38, 40, 42, 44, 46, 48 and input and output devices 28, 30, 54, 56, 60, 62, often in a relatively randomized order based upon the building layout and construction schedule of the building 18. As the various devices are positioned and installed, the electrician/installer connects them to the power source (not shown), to the communications network 14 and to other equipment as necessary. During installation, the units may be powered on/off several times to check local performance. The network 14 may be segmented and individual segments may have power applied and merged with other segments at any time.

Figure 2:
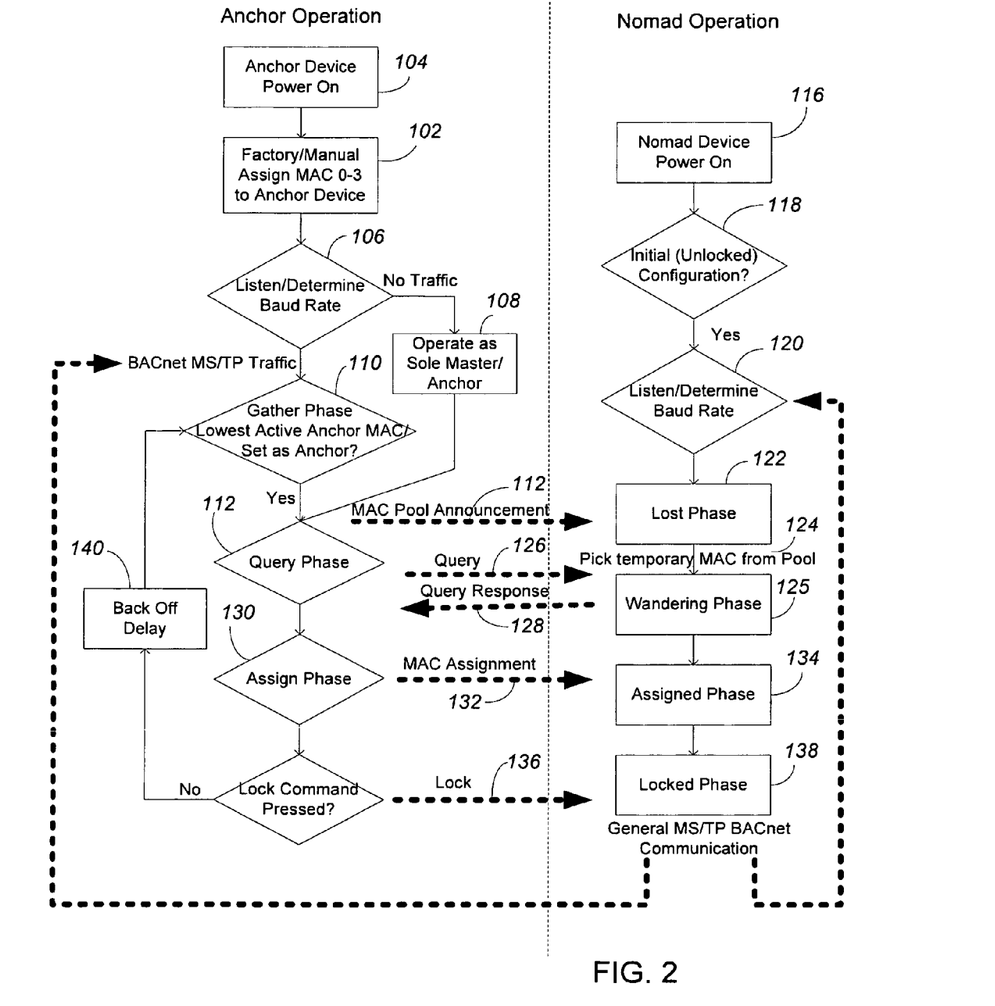
FIG. 2 is a flow chart detailing the operation of the present invention.

The present invention resides in the MS/TP Automatic MAC Addressing ("MAMA") algorithm and/or method used when the BAS components 38, 40, 42, 44, 46, 48 are installed in a building 18 and added to the network 14, a flow chart of which is shown in FIG. 2. In FIG. 2, communications between BAS components are depicted in dark, dashed lines to contrast from the MAMA logic lines of the flow chart. Further, diamonds in the flow chart are used to represent analysis or decision making steps, whereas rectangles are used to represent activity without any analysis or decision making in the MAMA algorithm/method.

The MAMA functionality of FIG. 2 can be implemented in software or firmware, or possibly even in hardware implementations. In a software implementation, the MAMA algorithm/method could be recorded on a computer medium, such as a disc (not shown), which is then user loaded onto the BAS component(s) 38, 40, 42, 44, 46, 48 prior to or during installation. In an alternative software implementation, the MAMA algorithm/method could exist on a computer medium made available by transmission, such as over a wireless or wired network such as the internet via download, including a download directly into the BAS component(s) prior to or during installation. In a preferred firmware implementation, the MAMA algorithm/method is burned into memory as a computer program stored on the BAS component(s) 38, 40, 42, 44, 46, 48 as part of a manufacturing process. Importantly however, the burning or loading of the MAMA algorithm/method can be performed in an identical manner on all the BAS component(s) 38, 40, 42, 44, 46, 48 being installed and without customization, i.e., firmware containing the MAMA program can be burned onto all BAS components 38, 40, 42, 44, 46, 48, without requiring input of different MAC addresses for each component. This greatly simplifies the network installation procedure, as there is no need to distinguish between BAS components having different MAC addresses either during the manufacture or installation of all the BAS components.

The first installation step is to select 102 a particular BAS component to serve as the "anchor" master device. If not assigned as a master device, each other BAS component using the MAMA algorithm/method will act as a "nomad" device.

A DDC controller 38 may be separately burned, programmed or configured as a master anchor device, either by the manufacturer or by using a computer terminal connection to the controller 38. More preferably, a portion of the MAMA algorithm method enables controllers 38, 40, 42, 44, 46, 48 to function either as an anchor or as a nomad, with the determination as to whether to act as an anchor made either through a physical control switch on the controller 38 or via programming. By having a physical control, the MAMA algorithm can be fully implemented and initiated even without any computer terminal or PC connection and without any special programming device.

In the most preferred embodiment, the anchor assignment 102 is accomplished with the reset button 88. After the device 38 has been powered up 104, and regardless of whether any network communication connections have been made, the controller 38 will enter a "Normal" mode as evidenced by the READY LED 80. While in the "Normal" mode, anchor assignment 102 can be made by pressing and holding the reset button 88 for a period of time without removing the power jumper 70. For instance, pressing and holding the reset button 88 without removing the power jumper 70 will initially be acknowledged by a blinking of the READY LED 80 and will initiate a timer. After 10 seconds of holding the reset button 88, the effect depends upon the prior state of the controller 38:

a) If the controller 38 was previously an unlocked Nomad (controllers are initially configured by the manufacturer as unlocked Nomads), then the controller 38 changes its MAC address to an address within a defined anchor MAC address range. The defined anchor MAC address range is defined in accordance with BACnet MS/TP master MAC addresses, i.e., is a first range of integers selected from within 0 to 127. In the preferred embodiment, the defined anchor MAC address range is from 0 to 3. Prior to installation of the Anchor 38, the installer needs to verify that no BAS component 20, 22, 24, 26 existing on the MS/TP network 14 has a MAC of 3. The MAC address assigned 102 by pressing and holding the reset button 88 is 3. If another pre-existing BAS component 20, 22, 24, 26 on the MS/TP network 14 already has a MAC of 3, then the installer must either i) change the MAC address of that pre-existing BAS component to a MAC address other than 3, or ii) separately program the MAC address of the Anchor 38 to another available MAC address within the defined anchor MAC address range, e.g., an available MAC address from 0 to 2.

b) If the controller 38 was previously a locked Nomad (due to the locking process described below), then holding the reset button 88 without removing the power jumper 70 has no effect.

c) If the controller 38 was previously an Anchor which has not yet performed a Gather/Query/Assign logical loop (described below), then holding the reset button 88 without removing the power jumper 70 has no effect.

d) If the controller 38 was previously an Anchor which has performed a Gather/Query/Assign logical loop (described below), then the Anchor 38 initiates a Lock Command (described below) during its next logical loop.

e) If the controller 38 was previously an Anchor which has already performed a Lock Command, then the Anchor 38 returns the Back Off Delay sleep time to zero to more frequently run through Gather/Query/Assign logical loops.

Preferably the Anchor designation can also be separately assigned 102 via a personal computer connection with the DDC controller 38, such as using the workstation 32.

If a master controller 38 has been designated as an Anchor, then the next step 106 requires it to be wired into the MS/TP network 14. The Anchor 38 listens 106 to communication traffic on the MS/TP network 14 in an attempt to determine the baud rate of that traffic. The auto-bauding 106 can occur through any method known in the art or later developed. For MS/TP BACnet networks, usually the baud rate will be 9,600, 19,200, 38,400 or 76,800 bps. The standard auto-bauding 106 involves cycling through each of the four standard baud rates four times looking for valid BACnet traffic. If no traffic is heard on the network 14 after four cycles, then the Anchor 38 will operate as a sole master/Anchor 108 at a default baud rate of 38,400 bps.

Assuming traffic is observed on the network 14, after auto-bauding 106 the Anchor 38 will enter the Gather Phase 110, which involves analyzing MS/TP traffic on the BACnet MS/TP network 14 to determine existing MAC addresses being used on the BACnet MS/TP network 14. The Anchor 38 listens to the traffic on the network 14 and records all MAC addresses which are already in use. This Gather Phase 110 can vary in time based on baud rate and network traffic. In the preferred embodiment, typical initial gather times for each baud rate are as follows:

| Baud Rate | Gather Time (seconds) |
|---|---|
| 9,600 | 960 |
| 19,200 | 480 |
| 38,400 | 240 |
| 76,800 | 120 |

The Anchor 38 will automatically increase the gather time if network conditions warrant. Preferably the MAMA algorithm starting with the Gather Phase 110 can also be initiated via the computer terminal 32 at any time.

Note that the auto-bauding 106 and the Gather Phase 110 both occur in-situ in the building 18 on the actual MS/TP network 14 which will be in use during operation of the DDC controller 38. Because the MAMA algorithm/method operates after installation into the actual MS/TP network 14 of use, there is no reinstallation requirement that BAS components be installed in the same network position or MAC address as configured at the factory or in a separate configuration step.

Once the Gather Phase 110 is sufficiently completed, the Anchor 38 will attempt to determine if any Anchors having a lower MAC exist on the network 14. For instance, typically a computer workstation 32 will occupy the MAC 0, and can be easily programmed with the MAMA algorithm/method. If a lower MAC within the defined anchor MAC address range is identified, then the new Anchor 38 simply waits in the Gather Phase 110 to verify that the lower MAC master is operating as an Anchor. For instance, in the preferred embodiment, the lowest MAC anchor on the network 14 will issue a MAC Pool Announcement 112 at least every 12 hours. Observing a MAC Pool Announcement issued by the lower MAC master is verification that the lower MAC BAS component is acting as an Anchor. Anchors may also look for other anchors at times other than at the end of the Gather Phase.

Presuming the Gather Phase 110 does not identify an Anchor having a lower MAC on the network 14, the Anchor 38 will proceed to a Query Phase 114. In the Query Phase 114, the Anchor 38 issues a MAC Pool Announcement 112 of all available MAC addresses on the network 14 which were not observed being used in the Gather Phase 110. The range of available MAC addresses should be a second range of integers selected from within BACnet MAC addresses of 0 to 255, and having no overlap with the defined anchor MAC address range. In the preferred embodiment, the MAC Pool Announcement 112 is issued to a MAC address of 255 which is reserved for announcements. Thus, the typical MAC Pool Announcement 112 will consist of a data frame specified in accordance with BACnet MS/TP networking, to a MAC address of 255, which in its body identifies all MAC addresses within the range of 4 to 254 which are not currently being used on the MS/TP network 14. The preferred MAC Pool Announcement format identifies available MAC addresses in ranges, i.e., such as a data frame which specifies that MAC addresses 6-8, 10-12, 14-127, 129-134 and 136-254 are available. Alternatively, the MAC Pool Announcement 112 could be limited to available master MAC addresses, i.e., limited to BACnet MS/TP MAC addresses of 127 or less.

At this point, operation of the MAMA algorithm/method impacts the operation of Nomad BAS component(s) 40, 42, 44, 46, 48. Specifically, upon being powered on 116, each Nomad BAS component 40, 42, 44, 46, 48 verifies 118 whether it is still in (or has been put back in) its initial, unlocked configuration. Presuming the Nomad BAS component 40, 42, 44, 46, 48 is unlocked, it (similar to the Anchor 38) listens 120 to the network traffic, awaiting traffic that it can auto-baud to the network baud rate. Alternatively, if the Nomad BAS component 40, 42, 44, 46, 48 had already been locked at a particular MAC address, then the Nomad BAS component can immediately join the MS/TP network 14 at that MAC address and at the previously identified baud rate. Once a device 40,42,44, 46,48 has auto-bauded 120 onto the network baud rate, it will remain at that baud rate until the device 40, 42, 44, 46, 48 is reset.

Upon initially determining 120 the MS/TP network baud rate, the Nomad BAS component 40, 42, 44, 46, 48 enters a Lost Phase 122 awaiting a MAC Pool Announcement 112. Upon receipt of the MAC Pool Announcement 112, the Nomad randomly selects 124 an interim or temporary MAC address from out of the available MAC pool. Having selected an interim or temporary MAC address, the Nomad 40, 42, 44, 46, 48 is considered in the Wandering Phase 125.

Following issuing a MAC Pool Announcement 112, the Anchor 38 issues a series of queries 126, one at a time, to each MAC address within the available MAC Pool. For many of these queries 126 on a typical MS/TP network and installation, wherein only several of the maximum possible 255 MAC addresses will be used or added at any given time, no response will be received. When the query 126 is made to the MAC address which was randomly selected by one of the Nomad(s) 40, 42, 44, 46, 48, that Nomad 40, 42, 44, 46, 48 will wait a random period of time within a response time window, and then issue a query response 128. In the preferred embodiment, the response time window is from 2 to 16 milliseconds (4 to 38 response slots), depending upon baud rate. The purpose of the response time window, and of randomizing response times within the response time window, is to attempt to avoid data collisions of query responses 128 between two BAS components that randomly happened to select the same MAC address out of the MAC Pool Announcement 112. In other words, query response data collisions should only occur when two Nomads 40, 42, 44, 46, 48 have both randomly selected the identical available MAC address and randomly selected the same response time within the response time window.

The Anchor 38 makes note of which MAC addresses received a singular response of acceptable clarity, i.e., the final result of the Query Phase 114 is a list of unlocked Nomad devices that are physically connected to the network 14 which have uniquely selected a MAC address out of the MAC Pool Announcement 112. In operation, the duration of the Query Phase 114 can vary in duration from a few seconds to a few minutes depending on network conditions. The Query Phase time is primarily dictated by the MS/TP network token cycle time (i.e. how long it takes the token to make one complete cycle of the network 14).

Once the Anchor 38 has proceeded through the entire Query Phase 114, it enters the Assign Phase 130. For each singular (i.e., clearly only one Query Response 128 received) unlocked Nomad device 40,42,44,46,48, the Anchor 38 selects a MAC address, preferably low within the 4 to 127 range for a master BAS component or low within the 128 to 254 range for a slave BAS component, for assignment to that Nomad 40,42,44,46,48, avoiding MAC gaps as possible. It then issues a MAC Reassignment command 132 to that Nomad to reassign itself to that MAC address. For example, considering the MAC Pool Announcement 112 above of 6-8, 10-12, 14-127, 129-134 and 136-254, suppose singular query responses are received at MAC addresses of 45, 68, 112, 138 and 199. The Anchor 38 could then issue a series of dataframes, consistent with BACnet protocol on MS/TP networks:

for the BAS Component 42 which had assigned itself a MAC address of 45 to reassign to a MAC address of 6;
for the BAS Component 46 which had assigned itself a MAC address of 68 to reassign to a MAC address of 7;
for the BAS Component 40 which had assigned itself a MAC address of 112 to reassign to a MAC address of 8;
for the BAS Component 48 which had assigned itself a MAC address of 138 to reassign to a MAC address of 129; and
for the BAS Component 44 which had assigned itself a MAC address of 199 to reassign to a MAC address of 130.

The MAC Reassignment command 132 can be implemented either as a broadcast message or a particular message to each Nomad.

If multiple responses 128 were received from a query 126 at a particular MAC address, or if the response 128 to the query 126 was unclear indicating a data collision, the Anchor 38 does not issue a MAC reassignment command 132 to that address.

The MAC reassignment commands 132 help to keep the MAC addresses on the network 14 in a relatively reasonable order, using consecutive MAC addresses where possible to avoid gaps. Additionally, the Anchor 38 can be programmed with a BACnet "Max_Master" property, which is the largest MAC address allowed on the MS/TP network and which will determine the number of Nomads it will allow to join the network 14. The MAC reassignment command 132 will ensure that each reassigned MAC address is lower than the "Max_Master". In the preferred embodiment, the "Max_Master" property is set by default to 127. Lower values for the "Max_Master" property will shorten and simplify the Query Phase 114. In other embodiments, the Anchor 38 may not reassign any MAC addresses, but rather might issue an instruction to each singular Nomad 40,42, 44, 46, 48 to retain the same randomly selected MAC address, i.e. to not return to the Lost Phase 122. During the Assigned/Active Phase 134, each BAS component which had received the Reassignment Command 132 joins the MS/TP network 14 at that MAC address. The Nomad joins the MS/TP network 14 at the reassigned MS/TP Master MAC address and announces its presence with a BACnet I-Am message.

Following the Assign Phase 130, the Anchor 38 will check to determine if it has been instructed to give a Lock Command 136. Presuming the Anchor 38 has not been instructed to issue a Lock Command 136, the Anchor 38 will return to the Gather Phase 110, repeating through the Query Phase 114 and the Assign Phase 130. The Anchor 38 continues to repeat the Gather Phase 110, the Query Phase 114 and the Assign Phase 130 in a quasi-infinite loop, meaning that the logical loop repeats either infinitely or at least until some other command or programming takes the Anchor 38 out of the loop. If the Anchor 38 has been instructed to issue a Lock Command 136, the Lock Command 136 can be issued either as a broadcast message or a particular message to each Nomad.

When a Nomad with an assigned MAC address receives the Lock command 136, it stores the assigned MAC address into non-volatile data storage making it permanent 138, executes a reset and joins the network 14 with its permanent MAC address. Once this occurs, the device is no longer considered a Nomad. If a Nomad has not 'Locked' the assigned MS/TP MAC address before it resets or power cycles, it forgets the assigned MAC address and will revert back to the initial Nomad state, the Lost Phase 122.

Even without a reset or power cycle, Nomads which have not received a MAC assignment 132 will return to the Lost Phase 122 and randomly pick a new temporary MAC from the next MAC Pool Announcement 112. Normally just one or several loops through this process will result in a unique MAC being assigned to all newly added BAS components 40, 42, 44, 46, 48 on the network 14. Typically, at a baud rate of 38,400, Nomads begin to join the network 14 (i.e. participate in token passing) within 3 to 5 minutes after they are powered on 116.

To minimize the impact of network bandwidth utilization of MAMA MS/TP frames, the Anchor 38 preferably executes a back-off delay 140. When successive Gather Phases 110 and Query Phases 112 fail to discover any new Nomad devices, the Anchor 38 will introduce a sleep period 140 between the Assign Phase 130 and Gather Phase 110. This sleep period 140 will increase in duration upon successive loops over time until the sleep time 140 is in excess of one hour, and most preferably about 12 hours. After several hours of the Gather 110 and Assign Phase 130, the MAMA routine will occupy insignificant bandwidth until or unless the Anchor 38 device is reset. It is thereafter necessary to reset or otherwise command the Anchor 38 device to quickly discover any recently added Nomad devices, e.g., such as when BAS components 92, 94 are added.

While Anchor devices must be BACnet MS/TP masters, Nomad devices can be either BACnet MS/TP masters or BACnet MS/TP slaves. Further, the Nomad operation in the preferred embodiment is characterized as running through the entire MAMA algorithm/method without adding any real analysis or decision making beyond that of prior art devices. Basically, other than two simple random selections, the Nomad devices simply respond to instructions provided from the Anchor 38. Accordingly, the MAMA algorithm/method can be implemented particularly in Nomad devices with minimal additional memory or computational requirements, i.e., can be fully implemented in virtually all cases without increasing the cost of BACnet masters and slaves and with minimal processing and minimal response time.

To make the MS/TP MAC Address assignment permanent in the Nomad device(s), the installer indicates this to the Anchor 38 device by depressing the Anchor's reset button 88 for 10 seconds. This causes the Anchor 38 device to execute the MAMA Lock instruction 136, locking each Nomad into their assigned MAC address. The MAMA Lock function 136 can also be invoked from the computer terminal 32, such as with a PC based software user interface that is programmed with this capability such as the BAC-5001 BACstage configuration tool available from KMC Controls of New Paris, Ind. If desired, the entire MAMA algorithm can terminate upon the issuance of a MAMA Lock instruction 136 until the Anchor 38 is reset. More preferably, the Gather/Query/Assign loop continues with the maximum Back Off Delay 140, such as the performance of one loop every twelve hours.

The communication and ready LEDs 82, 80 may have various functions to visually indicate various stages of the MAMA routine. In the preferred embodiment, the READY LED 80 operates as follows. At power-up 104, 116, the READY LED 80 will be solid ON during initialization (approximately 5-35 seconds). Once initialization is complete, Normal operation is indicated. The preferred normal operation indication is a standard repeating blinking pattern (ON for 1 second, OFF for 1 second). When the reset button 88 is pressed, the READY LED 80 is turned ON and kept ON until either a) the reset button 88 is released or b) the reset timeout is reached and a reset operation is completed. If the reset timeout has been reached, the READY LED 80 pattern depends upon the Anchor/Nomad state of operation. A second identifiable repeating blinking pattern (ON for 100 ms and OFF for 100 ms) indicates that the device has received an Anchor assignment 102 and set its MAC address to 3. This pattern repeats indefinitely until power is cycled, at which point the Anchor assignment 102 takes effect and READY LED 80 operation is restored to Normal. A third identifiable repeating blinking pattern (ON 200 ms, OFF 200 ms, ON 200 ms, OFF 1100 ms) indicates that a MAMA Lock Command 136 has been sent. The MAMA Lock Command Pattern will continue until the reset button 88 is released. In any of the situations where pressing the reset button 88 has no effect, the READY LED 80 turns off when the reset button 88 is pressed and stays off until the reset button 88 is released.

The communications LED 82 includes indications for each of the Sole Master, Token Pass, Device Error, Nomad Lost, Nomad Wandering, Nomad Assigned & Disconnected states. In general, a solid OFF state of the COMM LED 82 indicates that no MS/TP network has been detected. A first identifiable repeating blinking pattern (ON for 900 ms and OFF for 200 ms) indicates that the device has either generated the Token or is Sole Master 108 and has not yet established communication with other devices. Whenever there is a token pass, the COMM LED 82 flashes ON for 100 ms. The frequency of the flash is an indication of how often the device receives the token.

Three COMM LED patterns are used to indicate the reception of valid MS/TP MAMA frames when the device is a Nomad. MS/TP traffic is monitored for 7 seconds. Detection of valid data within the 7 second window is indicated by the COMM LED flash pattern. In the preferred patterns, the Lost Phase 122 of a Nomad is communicated by the COMM LED 82 flashing on for 1100 ms. A second identifiable blinking pattern (on 1500 ms, off 100 ms, on 100 ms, off 100 ms, on 100 ms, off 100 ms, on 100 ms, off . . . ) indicates that the Nomad is in the Wandering Phase 125. A third identifiable blinking pattern (on 100 ms, off 100 ms, on 100 ms, off 100 ms, on 100 ms, off 100 ms, on 1500 ms, off . . . ) indicates that the Nomad is in the Assigned/Active Phase 134. A pattern of the COMM LED 82 of on 2000 ms and then off indicates the reception of valid MS/TP frames when the device is disconnected.

Additionally, the READY LED 80 and the COMM LED 82 may have a combined function to indicate a device initialization error. A device initialization error is indicated by a repeating pattern of alternating the READY LED 80 and the COMM LED 82, i.e., READY LED 80 on & COMM LED 82 off for 500 ms, followed by READY LED 80 off and COMM LED 82 on for 500 ms, in a repeating pattern. This is an indication the read of the BACnet Device Parameter file failed and therefore the device is dead. The only recovery for this is to restore the factory defaults.

The typical installation scenario is:

1) The electrician installs the BAS components 38, 40, 42, 44, 46, 48, connecting them to their power source, the network 14 and other equipment 54, 56, 60, 62 as necessary. During this process, the units 38, 40, 42, 44, 46, 48, may be powered on/off as described above. When the electrician has finished installation and all BAS components 20, 22, 24, 26, 32, 38, 40, 42, 44, 46, 48 on a MS/TP network are connected to the network 14, the system 10 is ready for the technician to complete the installation.

2) The technician will cycle power to all the nodes 20, 22, 24, 26, 32, 38, 40, 42, 44, 46, 48 on the network 14. This will cause the MAC assignment process to begin.

3) The technician will make 102 one controller 38 the Anchor allowing the MAMA process to proceed.

4) After a couple of hours, the technician will have the Anchor 38 send the 'Lock' command 136. The technician may monitor the network 14 via a workstation/configuration tool to verify that all devices have joined the network 14 before sending the Lock command 136.

Thus, in the preferred MAMA function, at least one device on the MS/TP network 14 is an Anchor 38. If there are multiple Anchors on the network 14, the Anchor device with lowest MAC address will take precedence. Other devices with a fixed or permanent MAC addresses may be on the network 14 when the MAMA algorithm is operating. The Anchor 38 will observe all static MAC addresses that will be in use on the network 14 so that it can properly determine the pool of unused MAC addresses. The various Nomad devices will then be automatically assigned unused MAC addresses to join the MS/TP network 14 in a non-conflicting, orderly way.

The MAMA algorithm/method eliminates the need for human intervention to assign the required unique MS/TP MAC addresses while eliminating the chance for error(s) and making the network performance highly efficient. It is very advantageous from an installed cost basis for HVAC DDC controller product lines to have the ability to automatically configure the MS/TP MAC Address for each controller on an MS/TP Network 14 during the installation process.

Although the present invention has been described with reference to preferred embodiments, workers skilled in the art will recognize that changes may be made in form and detail without departing from the spirit and scope of the invention.

The invention claimed is:

1. A building automation system having at least two components which can communicate via a BACnet MS/TP network, comprising:
a DDC controller configured to communicate in a BACnet MS/TP network, the DDC controller being installable into a building as part of a BACnet MS/TP network;
a BAS component configured to communicate with the DDC controller via the BACnet MS/TP network, the BAS component having a BACnet MS/TP MAC address which is assigned by the DDC controller to the BAS component after installation of both the DDC controller and the BAS component into the BACnet MS/TP network in the building;
wherein the DDC controller assigns the BACnet MS/TP MAC address through an automated algorithm comprising:
analyzing MS/TP traffic on the BACnet MS/TP network to determine existing MAC addresses being used on the BACnet MS/TP network;
wherein, as part of the automated algorithm:
the DDC controller makes a MAC pool announcement on the BACnet MS/TP network of available MAC addresses;
the BAS component randomly selects an interim MAC address from out of the announced available MAC pool;
the DDC controller queries MAC addresses from out of the announced available MAC pool, and the BAS component responds when the DDC controller queries the interim MAC address; and
the DDC controller analyzes whether multiple responses were received from a queried MAC address, and reperforms the available MAC pool announcement, the queries and the analysis until no multiple responses are received from any queried MAC address.

2. The building automation system of claim 1, wherein the DDC controller has its MAC address within a first range of integers selected from within 0 to 127, and wherein the BAS component has its MAC address assigned within a second range of integers selected from within 0 to 255, and wherein the first range has no overlap with the second range.

3. The building automation system of claim 1, wherein, as part of the automated algorithm, the DDC controller analyzes whether a single response was received from a queried MAC address, and assigns a MAC address to the BAS component providing the single response.

4. The building automation system of claim 1, wherein the reperformance is performed in a quasi-infinite loop, with the frequency of performing the quasi-infinite loop delayed upon successive loops.

5. The building automation system of claim 1, wherein, after the DDC controller has assigned a BACnet MS/TP MAC address to all responding BAS components on the BACnet MS/TP network, the DDC controller can issue a command for all BAS components with a BACnet MS/TP MAC address assigned to lock the assigned address into memory.

6. The building automation system of claim 5, wherein the DDC controller assigns the BACnet MS/TP MAC through an automated algorithm, and wherein the DDC controller has a physical control for initiation of the MAC lock command.

7. The building automation system of claim 6, wherein the MAC lock command can also be initiated via a personal computer connection with the DDC controller.

8. The building automation system of claim 5, wherein the DDC controller assigns the BACnet MS/TP MAC through an automated algorithm, and the MAC lock command can be initiated via a personal computer connection with the DDC controller.

9. The building automation system of claim 1, wherein the DDC controller assigns the BACnet MS/TP MAC through an automated algorithm, and wherein the DDC controller has a physical control for initiation of the automated algorithm.

10. The building automation system of claim 9, wherein the automated algorithm can also be initiated via a personal computer connection with the DDC controller.

11. The building automation system of claim 1, wherein the DDC controller assigns the BACnet MS/TP MAC through an automated algorithm, and wherein the automated algorithm can be initiated via a personal computer connection with the DDC controller.

12. A method of automating the assignment of MAC addresses to building automation system components which can communicate via a BACnet MS/TP network, comprising:

installing a DDC controller configured to communicate in a BACnet MS/TP network into a building, the DDC controller being installable into a building as part of a BACnet MS/TP network;

installing a BAS component configured to communicate with the DDC controller via the BACnet MS/TP network into the building;

having the DDC controller automatically assign the BAS component with a BACnet MS/TP MAC address after installation of both the DDC controller and the BAS component into the BACnet MS/TP network in the building, wherein the DDC controller assigns the BACnet MS/TP MAC address through an automated algorithm comprising:

analyzing MS/TP traffic on the BACnet MS/TP network to determine existing MAC addresses being used on the BACnet MS/TP network;

wherein, as part of the automated assigning:

the DDC controller makes a MAC pool announcement on the BACnet MS/TP network of available MAC addresses;

the BAS component randomly selects an interim MAC address from out of the announced available MAC pool;

the DDC controller queries MAC addresses from out of the announced available MAC pool, and the BAS component responds when the DDC controller queries the interim MAC address; and     the DDC controller analyzes whether multiple responses were received from a queried MAC address, and reperforms the available MAC pool announcement, the queries and the analysis until no multiple responses are received from any queried MAC address.

13. A method of assignment of MAC addresses to building automation system components which can communicate via a BACnet MS/TP network, comprising:

analyzing MS/TP traffic on the BACnet MS/TP network to determine existing MAC addresses being used on the BACnet MS/TP network;

making a MAC pool announcement on the BACnet MS/TP network of available MAC addresses;

having at least one building automation system component self-select an interim MAC address from out of the announced available MAC pool;

individually querying each of a plurality of MAC addresses from out of the announced available MAC pool, to which the building automation system component responds to the query at the self-selected interim MAC address;

analyzing whether multiple responses were received from a queried MAC address, and reperforming the available MAC pool announcement, the queries and the analysis until no multiple responses are received from any queried MAC address; and     following receiving an acceptable response from the building automation system component, reassigning the building automation system component from the self-selected interim MAC address to a final MAC address for use on the BACnet MS/TP network.

14. The method of claim 13, wherein an acceptable response is a single response was received from a queried MAC address, and further comprising:

analyzing to determine whether a single response was received to the queried MAC address on the BACnet MS/TP network.

15. The method of claim 13, further comprising:

analyzing MS/TP traffic on the BACnet MS/TP network to determine existing MAC addresses being used on the BACnet MS/TP network prior to making the MAC pool announcement; and wherein the final MAC address is automatically reassigned to keep a collection of all final MAC addresses being used on the BACnet MS/TP network in a defined order using consecutive MAC addresses to avoid gaps.

\* \* \* \* \*